United States Patent
Ieda

(10) Patent No.: US 8,226,275 B2
(45) Date of Patent: Jul. 24, 2012

(54) OPTICAL EMITTING MODULE

(75) Inventor: Tomoaki Ieda, Osaka (JP)

(73) Assignee: Panasonic Corporation, Osaka (JP)

(*) Notice: Subject to any disclaimer, the term of this patent is extended or adjusted under 35 U.S.C. 154(b) by 8 days.

(21) Appl. No.: 12/911,863

(22) Filed: Oct. 26, 2010

(65) Prior Publication Data

US 2011/0103069 A1 May 5, 2011

(30) Foreign Application Priority Data

Oct. 30, 2009 (JP) .................................. 2009-249797
Oct. 8, 2010 (JP) .................................. 2010-228283

(51) Int. Cl.
*F21V 3/00* (2006.01)

(52) U.S. Cl. ............... 362/311.01; 362/311.02; 362/326; 362/608

(58) Field of Classification Search ................... 362/253, 362/311.01, 311.02, 326, 608; 353/31, 33
See application file for complete search history.

(56) References Cited

U.S. PATENT DOCUMENTS

2008/0212037 A1* 9/2008 Shyshkin et al. ............... 353/33

FOREIGN PATENT DOCUMENTS

| JP | 11-014935 | 1/1999 |
|---|---|---|
| JP | 2005-142447 | 6/2005 |

* cited by examiner

*Primary Examiner* — Stephen F Husar
*Assistant Examiner* — Meghan Dunwiddie
(74) *Attorney, Agent, or Firm* — Wenderoth, Lind & Ponack, L.L.P.

(57) ABSTRACT

An optical emitting module includes a light-emitting device that emits light, and a lens member having a refracting surface configured to refract light emitted from the light-emitting device and to emit refracted light. The lens member is configured such that, when the angle of a light beam emitted from the lens member with respect to a principal light axis is $\theta_1$, a light beam with the maximum emission angle $\theta_1$ from the lens member is emitted from the refracting surface in the vicinity of a point where the refracting surface and the principal light axis cross each other. With this configuration, even when the light-emitting surface of a light source is large, it is possible to suppress the spread of emergent light from the lens member, obtaining a light intensity distribution with high uniformity.

6 Claims, 16 Drawing Sheets

|  | (a) FIRST EMBODIMENT OF THE INVENTION | (b) RELATED ART |
|---|---|---|
| $\theta_0$ | SMALL | LARGE |
| CHANGE IN $\theta_0$ (CHANGE IN $\theta_a$) | SAME LEVEL | SAME LEVEL |
| $\theta_a$ | SMALL | LARGE |
| $d\theta_b / d\theta_a$ | SMALL | LARGE |
| CHANGE IN $\theta_1$ (CHANGE IN $\theta_b$) | SMALL | LARGE |

FIG. 16

| R | 1.505 |
|---|---|
| K | 0 |
| A1 | −0.469 |
| A2 | 0.494 |
| A3 | −1.993 |
| A4 | 5.739 |
| A5 | −9.088 |
| A6 | 8.000 |
| A7 | −3.669 |
| A8 | 0.686 |

FIG. 17

| x [mm] | Z [mm] |
|---|---|
| 0 | 0.000 |
| 0.05 | −0.022 |
| 0.1 | −0.040 |
| 0.15 | −0.056 |
| 0.2 | −0.070 |
| 0.25 | −0.081 |
| 0.3 | −0.090 |
| 0.35 | −0.097 |
| 0.4 | −0.101 |
| 0.45 | −0.102 |
| 0.5 | −0.101 |
| 0.55 | −0.097 |
| 0.6 | −0.090 |
| 0.65 | −0.081 |
| 0.7 | −0.068 |
| 0.75 | −0.053 |
| 0.8 | −0.034 |
| 0.85 | −0.012 |
| 0.9 | 0.015 |
| 0.95 | 0.045 |
| 1 | 0.080 |
| 1.05 | 0.120 |
| 1.1 | 0.166 |
| 1.15 | 0.218 |
| 1.2 | 0.278 |
| 1.25 | 0.347 |
| 1.3 | 0.428 |
| 1.35 | 0.526 |
| 1.4 | 0.648 |
| 1.45 | 0.814 |
| 1.5 | 1.123 |

FIG. 19

| R | 1.505 |
|---|---|
| K | 0 |
| A1 | −0.181 |
| A2 | 0.480 |
| A3 | −2.145 |
| A4 | 6.286 |
| A5 | −9.984 |
| A6 | 8.801 |
| A7 | −4.042 |
| A8 | 0.758 |

FIG. 20

| x [mm] | Z [mm] |
|---|---|
| 0 | 0.000 |
| 0.05 | −0.007 |
| 0.1 | −0.012 |
| 0.15 | −0.013 |
| 0.2 | −0.013 |
| 0.25 | −0.011 |
| 0.3 | −0.006 |
| 0.35 | 0.001 |
| 0.4 | 0.010 |
| 0.45 | 0.022 |
| 0.5 | 0.037 |
| 0.55 | 0.054 |
| 0.6 | 0.075 |
| 0.65 | 0.098 |
| 0.7 | 0.123 |
| 0.75 | 0.152 |
| 0.8 | 0.185 |
| 0.85 | 0.221 |
| 0.9 | 0.261 |
| 0.95 | 0.305 |
| 1 | 0.354 |
| 1.05 | 0.408 |
| 1.1 | 0.468 |
| 1.15 | 0.535 |
| 1.2 | 0.609 |
| 1.25 | 0.694 |
| 1.3 | 0.790 |
| 1.35 | 0.904 |
| 1.4 | 1.043 |
| 1.45 | 1.227 |
| 1.5 | 1.557 |

OPTICAL EMITTING MODULE

BACKGROUND OF THE INVENTION

1. Field of the Invention

The present invention relates to an optical emitting module that emits light of a light-emitting device with a desired light radiation intensity distribution. In particular, the present invention relates to an optical emitting module that, in an optical space transmission system that transmits information data, such as video data, sound data, or other digital data, in the form of a light signal between an optical space transmitter and an optical space receiver through a free space, is used for the optical space transmitter or the like.

2. Description of the Related Art

In a light-emitting device, such as a semiconductor light-emitting device (LED) or a semiconductor laser (LD), a light radiation intensity distribution (a change in radiation intensity with respect to the angle of the principal light axis of a light-emitting device) is determined in accordance with manufacturing or the like of the light-emitting device. However, a preferable light radiation intensity distribution differs in accordance with the purpose of the light-emitting device, and there are many cases where the light radiation intensity distribution of the light-emitting device does not become a light radiation intensity distribution suitable for the purpose. For this reason, it is necessary that an optical emitting module is provided with a lens or the like on the front surface of the light-emitting device such that the light radiation intensity distribution is approximated to the light radiation intensity distribution suitable for the purpose.

For example, in an optical space transmission system that transmits information data in the form of a light signal between an optical space transmitter and an optical space receiver through a free space, there is a purpose of securing a constant transmission distance when the angle from the principal light axis is within a transmission angle range $\pm\alpha$. At this time, if the angle of a light beam emitted from the optical emitting module with respect to the principal light axis of the optical emitting module is an emission angle $\theta_1$, a light radiation intensity distribution is preferable such that as little light as possible is emitted at the emission angle $\theta_1$ greater than $\alpha$, and the light radiation intensity is substantially uniform when the emission angle $\theta_1$ is in a range of 0 to $\alpha$.

A known optical emitting module which approximates the light radiation intensity distribution uses a prism (for example, Japanese Patent Unexamined Publication No. 11-14935). FIG. 23 shows a known optical module described in Japanese Patent Unexamined Publication No. 11-14935.

Referring to FIG. 23, optical emitting module 100 is provided with prism 102 on the front surface of light-emitting device 101. Prism 102 has a parallel central portion and an inclined peripheral portion. Out of light beams emitted from the center of light-emitting device 101, light beams with the emission angle $\theta_0$ equal to or smaller than the half-value angle $\theta_{OH}$ of the light-emitting device pass through the parallel central portion of prism 102 and are emitted with a substantially unchanged light intensity distribution. Meanwhile, light beams with the emission angle $\theta_0$ greater than $\theta_{OH}$ pass through the inclined portion of prism 102 and are deflected toward the light axis. With this configuration, the relationship between the emission angle $\theta_0$ of the light beam emitted from the center of light-emitting device 101 and the emission angle $\theta_1$ which is the angle with respect to the principal light axis when the light beam is emitted from prism 102 is as shown in FIG. 24. As a result, the light beams emitted from the center of optical emitting module 100 substantially have the same radiation intensity at the emission angle $\theta_1$ of 0 to $\theta_{OH}$, as shown in FIG. 25.

Another known optical emitting module uses a lens (for example, Japanese Patent Unexamined Publication No. 2005-142447). FIG. 26 shows a known light emitting module described in Japanese Patent Unexamined Publication No. 2005-142447.

Referring to FIG. 26, optical emitting module 200 is configured such that light-emitting device 201 is incorporated in lens 203 made of resin or the like. The shape of refracting surface 203a of lens 203 is determined such that a light beam is refracted in accordance with the following relationship between an emission angle $\theta_0$ which is the angle of emergent light from the center of light-emitting device 201 with respect to the principal light axis and an emission angle $\theta_1$ which is the angle with respect to the principal light axis when the light beam is emitted from lens 203.

$$\cos\theta_1 = 1 - (1-\cos^{m+1}\theta_0)(1-\cos\alpha) \qquad \text{(Expression 1)}$$

Here, $\alpha$ denotes a desired radiation angle of light (the above-described transmission angle range: $\pm\alpha$), and m denotes the coefficient of a Lambertian distribution described below.

For example, when $\alpha=15°$ and m=1, as shown in FIG. 27, the emission angle $\theta_0$ and the emission angle $\theta_1$ have a relationship that, as the emission angle $\theta_0$ changes from 0° to 90°, the emission angle $\theta_1$ increases monotonically from 0° to 15°.

Expression 1 settles the emergent light distribution from light-emitting device 201 assuming that a change $p(\theta_0)$ in the light radiation intensity with respect to the emission angle $\theta_0$ is a light radiation intensity distribution when a point light source with a Lambertian distribution expressed by the following expression is placed at the center of light-emitting device 201.

$$p(\theta_0) = p_0(1-\cos^m\theta_0) \qquad \text{(Expression 2)}$$

Here, $p_0$ denotes a light radiation intensity at $\theta_0=0°$ (on the light axis), and m denotes the coefficient of a Lambertian distribution. Expression 1 simply expresses in a mathematical form that the light radiation intensity distribution of Expression 2 emitted in a range of $-90°\leq\theta_0\leq 90°$ (that is, a semispherical space at the front surface of the light-emitting device) is converted to a uniform light radiation intensity distribution in a space of $-\alpha\leq\theta_1\leq\alpha$ outside lens 203. The expression is simply made in a mathematical form, thus if the light radiation intensity distribution is approximated to the Lambertian distribution on the minute light-emitting surface where light-emitting device 201 is close to the point light source, such that a substantially uniform radiation intensity distribution is obtained.

However, in the configuration of FIG. 23 using prism 102, the spread angle of light having passed through the prism is determined to be the half-value angle $\theta_{OH}$ of light-emitting device 101. Thus, this cannot be applied to a case where the half-value angle $\theta_{OH}$ and the transmission angle $\alpha$ are significantly different from each other. In the configuration of FIG. 23 using prism 102, since the size of the light-emitting device is not taken into consideration, when light-emitting device 101 does not have a minute light-emitting surface, the uniformity of the radiation intensity distribution may be significantly degraded.

In the configuration of FIG. 26 using lens 202, when light-emitting device 201 has a minute light-emitting surface, a uniform radiation intensity distribution can be formed in accordance with the transmission angle $\alpha$, regardless of the half-value angle of light-emitting device 201. Meanwhile, since the size of the light-emitting device is not taken into consideration, when light-emitting device 201 does not have a minute light-emitting surface, the uniformity of the radiation intensity distribution may be significantly degraded.

The invention has been finalized in order to solve the problems inherent in the related art, and provides an optical emitting module that, even when the light-emitting surface of the light-emitting device is large, reduces the effect of the size of the light-emitting surface on the light radiation intensity distribution, obtaining a light radiation intensity distribution close to desired characteristics.

SUMMARY OF THE INVENTION

According to an aspect of the invention, an optical emitting module includes a light-emitting device that emits light, and a lens member having a refracting surface configured to refract light emitted from the light-emitting device and to emit refracted light. The lens member is configured such that, when the angle of a light beam emitted from the lens member with respect to a principal light axis is $\theta_1$, a light beam at the maximum emission angle $\theta_1$ from the lens member is emitted from a refracting surface in the vicinity of a point where the refracting surface and the principal light axis cross each other.

With this configuration, even when the light-emitting surface of the light source is large, it is possible to suppress the spread of emergent light from the lens member, obtaining a light intensity distribution with high uniformity.

BRIEF DESCRIPTION OF THE DRAWINGS

FIG. 8 is an explanatory view showing a mode of refraction at an interface between air and resin or the like.

FIG. 16 is a diagram showing constant values of an aspheric lens calculation expression fitted to the shape of the refracting surface in the optical emitting module according to the first embodiment.

FIG. 17 is a diagram showing the shape coordinate values of the refracting surface in the optical emitting module according to the first embodiment.

FIG. 19 is a diagram showing constant values of an aspheric lens calculation expression fitted to the shape of the refracting surface in the design modification example of the optical emitting module according to the first embodiment.

FIG. 20 is a diagram showing the shape coordinate values of the refracting surface in the design modification example of the optical emitting module according to the first embodiment.

DETAILED DESCRIPTION OF PREFERRED EMBODIMENTS

Hereinafter, embodiments of the invention will be described with reference to the drawings.

First Embodiment

Figure 1A:
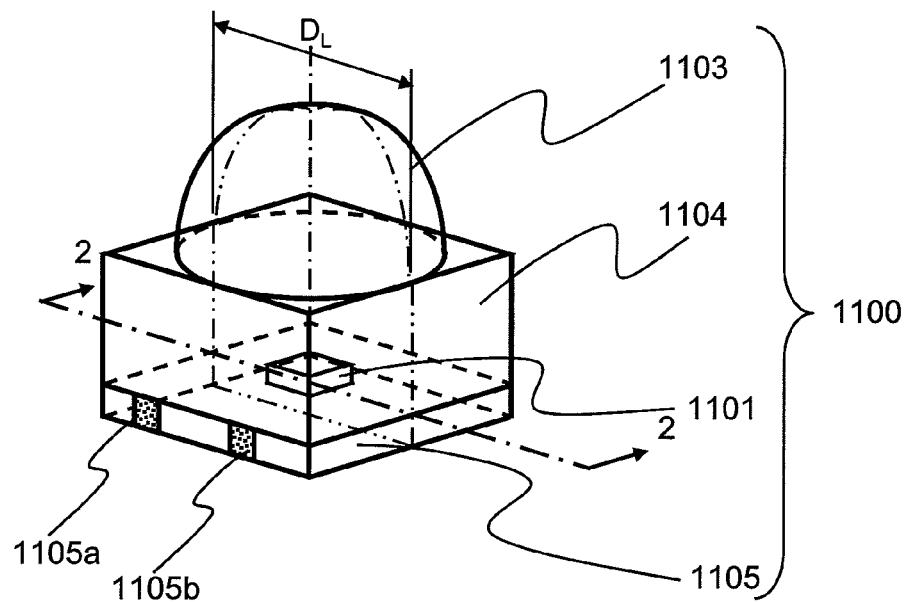
FIG. 1A is a perspective view of an optical emitting module according to a first embodiment.
Figure 1B:
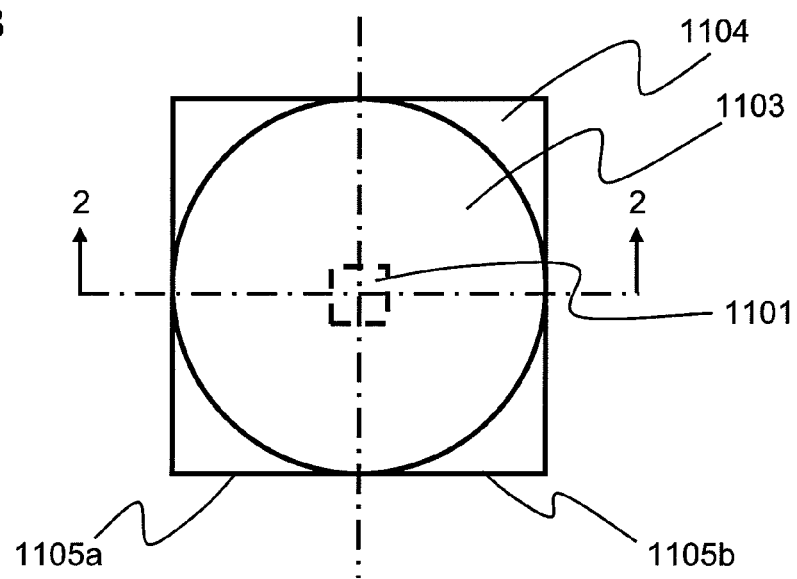
FIG. 1B is a top view of the optical emitting module according to the first embodiment.
Figure 2:
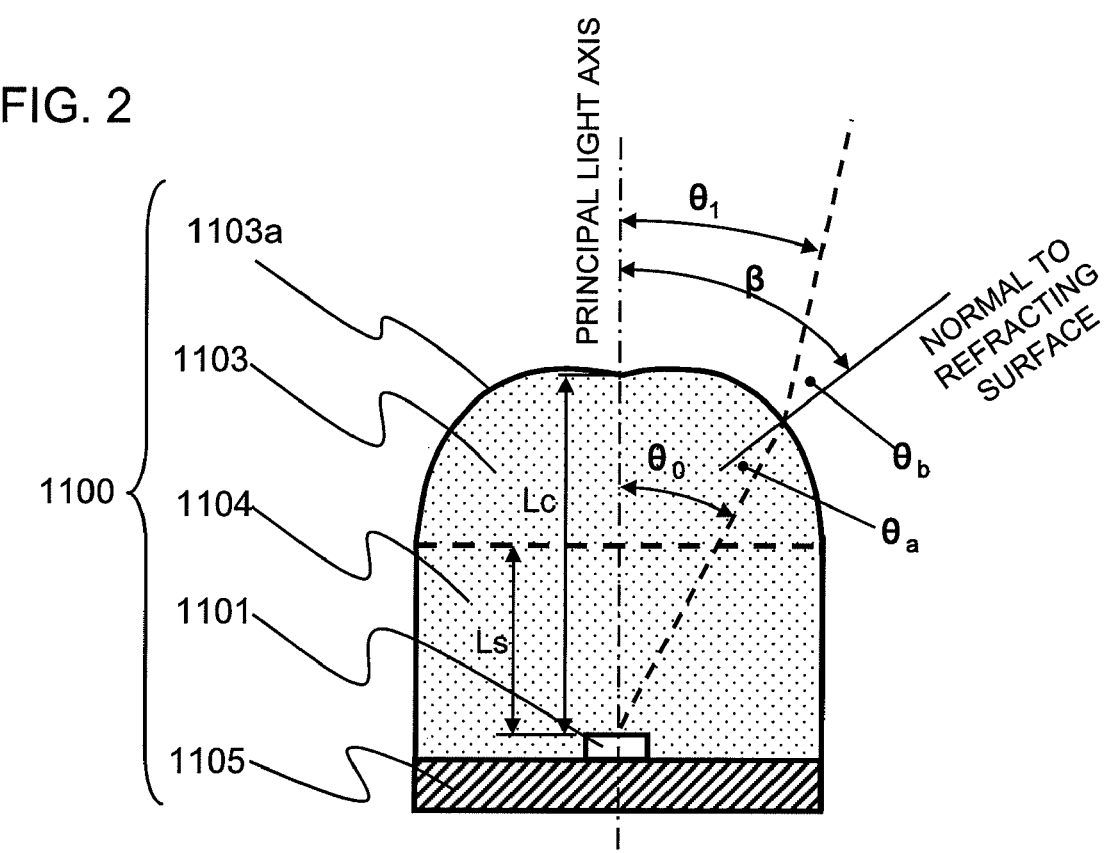
FIG. 2 is a sectional view of the optical emitting module shown in FIGS. 1A and 1B taken along the line 2-2.

FIG. 1A is a perspective view showing the configuration of an optical emitting module according to a first embodiment of the invention. FIG. 1B is a top view of the optical emitting module. FIG. 2 is a sectional view of the optical emitting module shown in FIGS. 1A and 1B taken along the line 2-2.

Referring to FIGS. 1A, 1B, and 2, light-emitting device 1101 of optical emitting module 1100 is mounted on the top surface of substrate 1105. Light-emitting device 1101 is, for example, a light-emitting diode (LED) and is electrically connected to substrate 1105 through a wiring, a solder, a bonding pad, or the like (not shown). Light-emitting device 1101 is connected to the outside through a wiring pattern on substrate 1105 and terminals 1105a and 1105b which are formed on the side surface of substrate 1105 using through holes or the like. Light-emitting device 1101 may be connected to an electrical component mounted on the substrate. Light-emitting device 1101 is sealed by seal member 1104. Lens member 1103 is provided on seal member 1104. Lens member 1103 is provided with refracting surface 1103a which refracts light from light-emitting device 1101 and emits refracted light outside lens member 1103. Light emitted from light-emitting device 1101 at an emission angle $\theta_0$ is emitted from lens member 1103 at an emission angle $\theta_1$ by refracting surface 1103a. The emission angle $\theta_0$ refers to the angle of a light beam emitted from light-emitting device 1101 with respect to a principal light axis, and the emission angle $\theta_1$ refers the angle of a light beam emitted from lens member 1103 with respect to the principal light axis.

Seal member 1104 is formed by filling a material having high transparency to the light-emission wavelength of light-emitting device 1101, such as epoxy resin or silicone resin. In the first embodiment, lens member 1103 is formed of the same material as seal member 1104 and molded with seal member 1104 as a single body through metallic molding simultaneously. Thus, optical emitting module 1100 can be formed at low cost.

Figure 3:
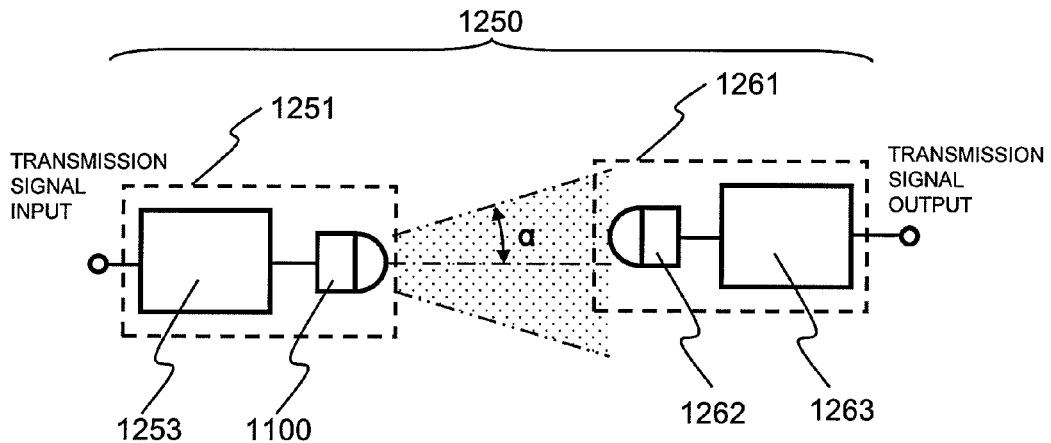
FIG. 3 is a block configuration diagram of an optical space transmission system using the optical emitting module according to the first embodiment.

FIG. 3 is a block diagram showing the schematic configuration of an optical space transmission system using optical emitting module 1100. Optical space transmission system 1250 includes optical space transmitter 1251 and optical space receiver 1261. Optical space transmitter 1251 includes modulation circuit 1253 and optical emitting module 1100, and optical space receiver 1261 includes light-receiving module 1262 and demodulation circuit 1263. Modulation circuit 1253 of optical space transmitter 1251 receives as an input a transmission signal which should be transmitted to optical space receiver 1261, and outputs an electrical signal for controlling optical emitting module 1100 in accordance with the transmission signal. Optical emitting module 1100 of optical space transmitter 1251 radiates a modulated light signal according to the electrical signal input from modulation circuit 1253 to a free space with a radiation intensity distribution according to a transmission angle α. Light-receiving module 1262 of optical space receiver 1261 receives the light signal having propagated through the free space and converts the light signal to an electrical signal. Demodulation circuit 1263 of optical space receiver 1261 demodulates the electrical signal output from light-receiving module 1262 to a transmission signal and outputs the transmission signal. Thus, signal transmission can be performed from optical space transmitter 1251 to optical space receiver 1261 by a light signal propagating through the free space.

Optical emitting module 1100 according to the first embodiment of the invention is different from known optical emitting module 200 in terms of the characteristics and operations of refracting surface 1103a formed in lens member 1103. The following description will be provided as to the characteristics and operations of refracting surface 1103a in optical emitting module 1100 according to the first embodiment of the invention.

Figure 4:
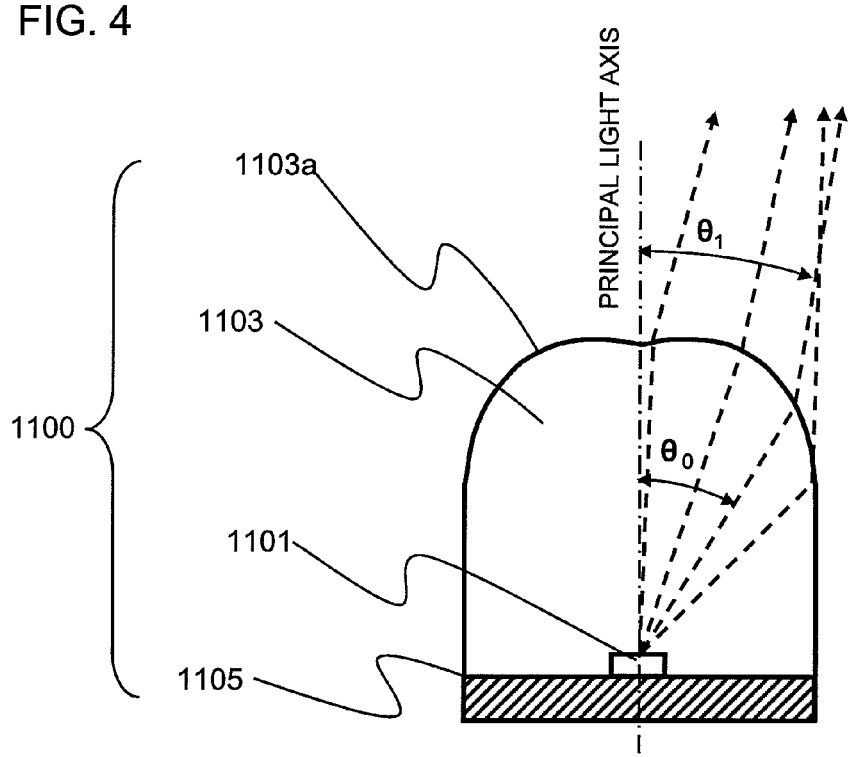
FIG. 4 is a light beam diagram showing the working of a refracting surface in the optical emitting module according to the first embodiment.
Figure 5:
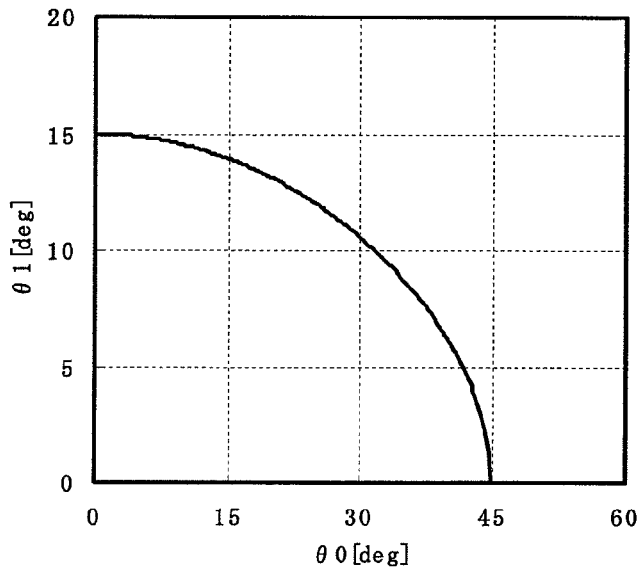
FIG. 5 is a characteristic diagram of the refracting surface in the optical emitting module according to the first embodiment.

FIG. 4 is a light beam diagram illustrating the operations of refracting surface 1103a, and shows the paths of multiple light beams emitted from the center of light-emitting device 1101 at different emission angles $\theta_0$. In optical emitting module 1100 of the first embodiment, as the emission angle $\theta_0$ from light-emitting device 1101 increases, the emission angle $\theta_1$ from lens member 1103 decreases. FIG. 5 is a characteristic diagram of refracting surface 1103a showing the relationship between the emission angle $\theta_0$ from light-emitting device 1101 and the emission angle $\theta_1$ from lens member 1103 in optical emitting module 1100 of the first embodiment. FIG. 5 clearly shows the characteristics of refracting surface 1103a in optical emitting module 1100 of the first embodiment that, as the emission angle $\theta_0$ from lens member 1103 increases, the emission angle $\theta_1$ from lens member 1103 decreases monotonically.

Figure 6:
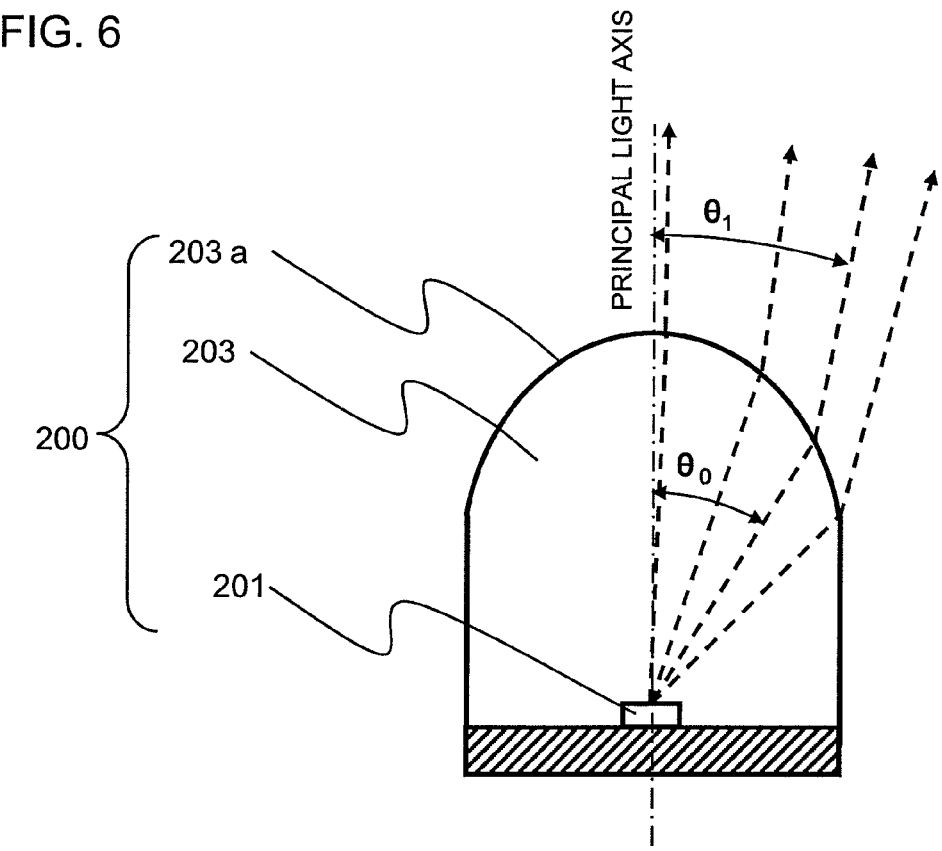
FIG. 6 is a light beam diagram showing the working of a refracting surface in a known optical emitting module.
Figure 23:
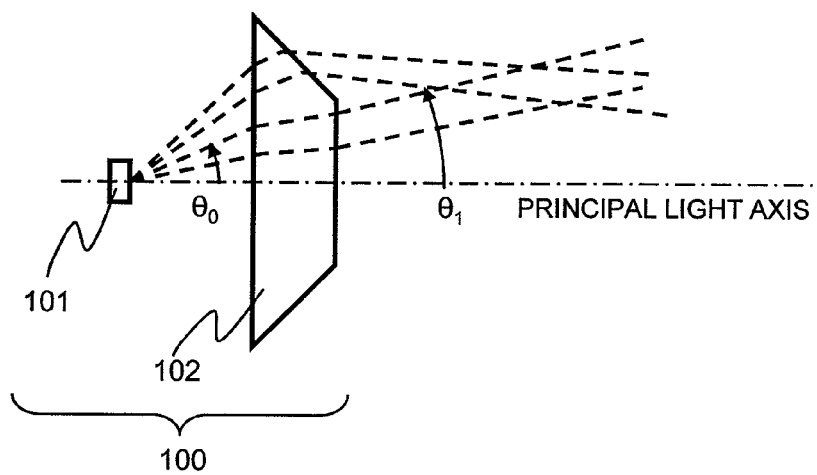
FIG. 23 is a configuration diagram showing a known optical emitting module described in Japanese Patent Unexamined Publication No. 11-14935.
Figure 24:
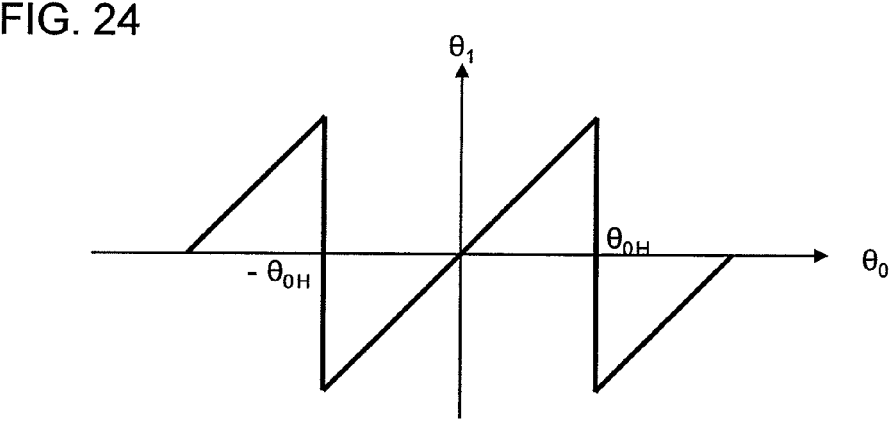
FIG. 24 is a characteristic diagram of a refracting surface in the known optical emitting module described in Japanese Patent Unexamined Publication No. 11-14935.
Figure 25:
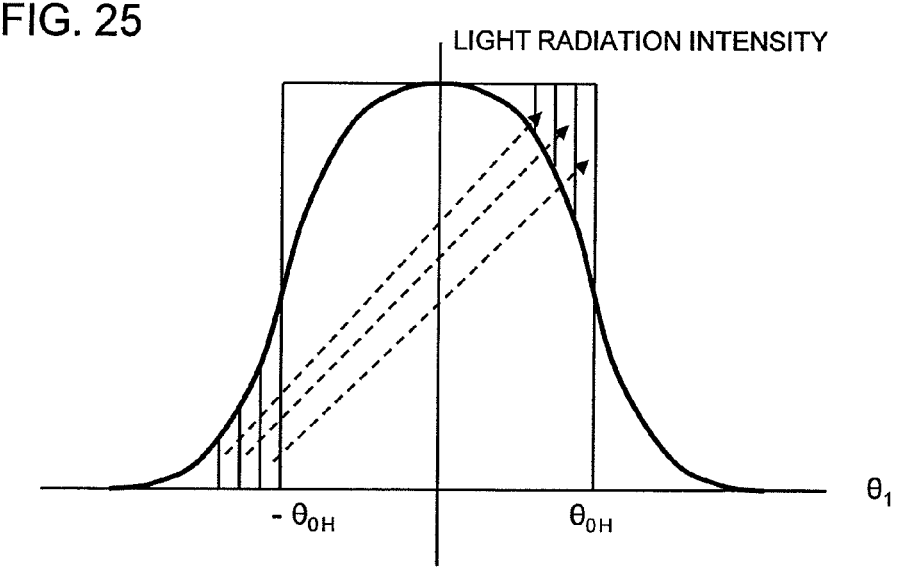
FIG. 25 is a working explanatory view for a radiation intensity distribution in the known optical emitting module described in Japanese Patent Unexamined Publication No. 11-14935.
Figure 26:
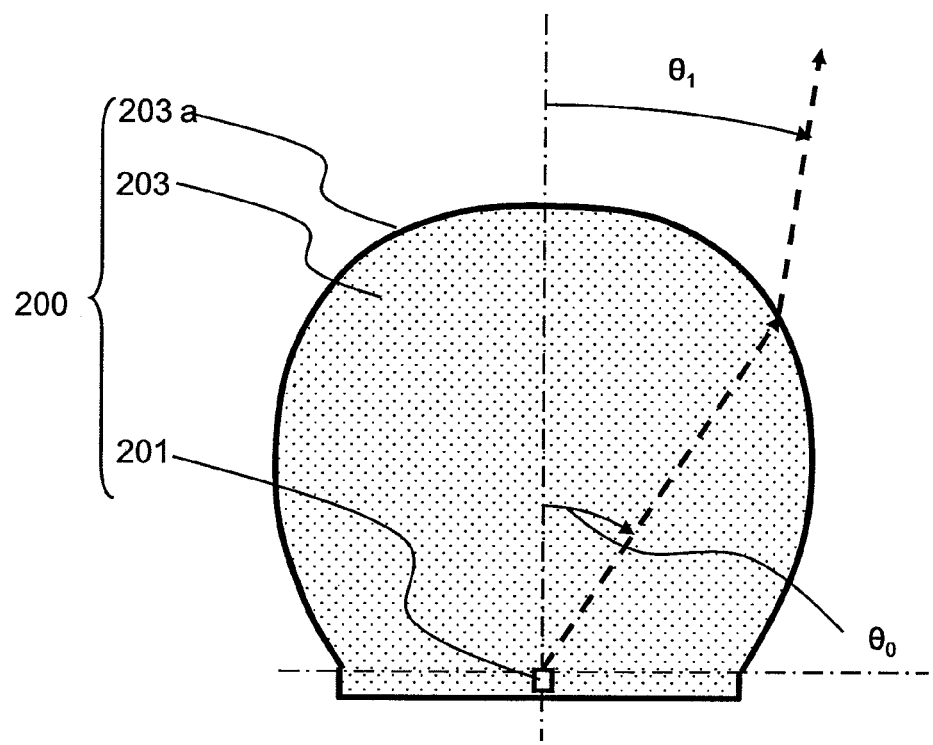
FIG. 26 is a configuration diagram of a known optical emitting module described in Japanese Patent Unexamined Publication No. 2005-142447.
Figure 27:
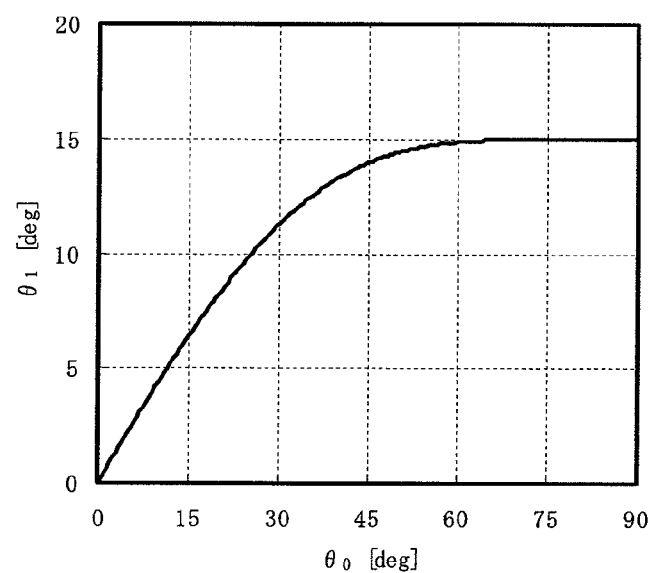
FIG. 27 is a characteristic diagram of a refracting surface in the known optical emitting module described in Japanese Patent Unexamined Publication No. 2005-142447.

Meanwhile, FIG. 6 is a light beam diagram showing the working of refracting surface 203a in known optical emitting module 200 described in Japanese Patent Unexamined Publication No. 2005-142447 for comparison with the optical emitting module of the first embodiment shown in FIG. 4. In known optical emitting module 200 described in Japanese Patent Unexamined Publication No. 2005-142447, as the emission angle $\theta_0$ from light-emitting device 201 increases, the emission angle $\theta_1$ from lens member 203 also increases. Known optical emitting module 200 shown in FIG. 26 has a feature that, as shown in FIG. 27, as the emission angle $\theta_0$ from light-emitting device 201 increases, the emission angle $\theta_1$ from lens member 203 increases monotonically. This is different from the characteristic of the optical emitting module of the first embodiment. In the known optical emitting module shown in FIG. 23 described in Japanese Patent Unexamined Publication No. 11-14935, as shown in FIG. 24, while there is a discontinuous portion when $\theta_0 = \pm\theta_{0H}$, in a different range, as the emission angle $\theta_0$ from light-emitting device 201 increases, the emission angle $\theta_1$ from lens member 203 increases monotonically.

Figure 7:
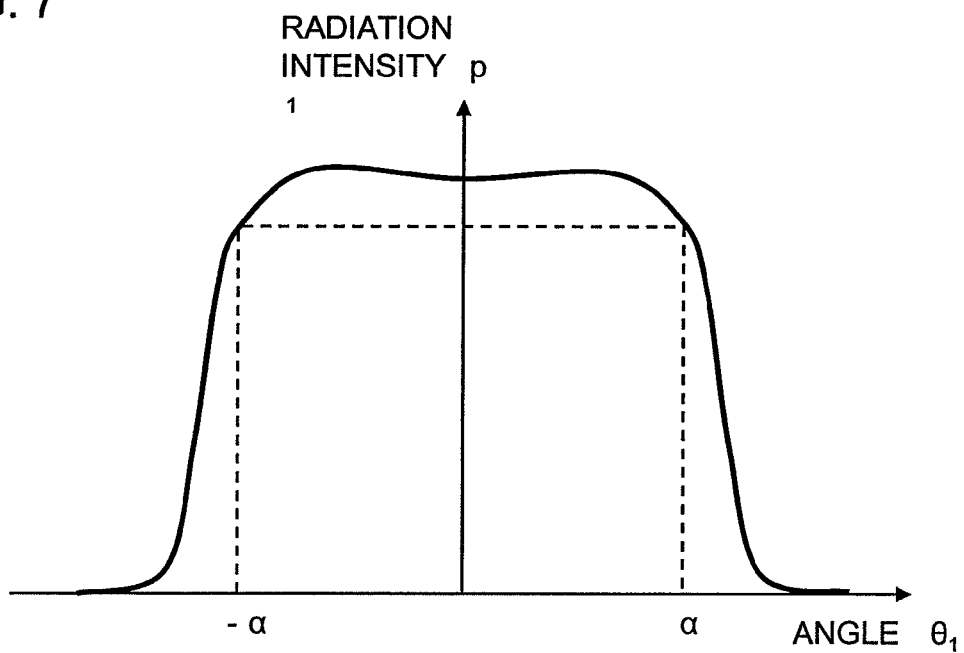
FIG. 7 is a conceptual diagram of a radiation intensity distribution in the optical emitting module according to the first embodiment.

In optical space transmission system 1250 shown in FIG. 3, the minimum transmission distance within the transmission angle range ±α is determined depending on the minimum radiation intensity within the transmission angle range ±α of optical emitting module 1100. FIG. 7 is a diagram conceptually showing an example of the distribution of radiation intensity $p_1$ from optical emitting module 1100. For example, when optical emitting module 1100 has a radiation intensity distribution shown in FIG. 7, the minimum transmission distance is determined depending on the minimum radiation intensity within the transmission angle range ±α indicated by a broken line. Thus, a very large amount of light power falls within the transmission angle range ±α, and a very uniform radiation intensity distribution is achieved within the transmission angle range ±α, extending the minimum transmission distance in optical space transmission system 1250.

For such a purpose, it is preferable that the relationship between the emission angle $\theta_0$ from light-emitting device 1101 and the emission angle $\theta_1$ of emergent light from lens member 1103 is established by the following expression.

$$\cos\theta_1 = \frac{\cos\theta_{1max} - \cos\theta_{1min}}{1-\cos^{m+1}\theta_{0max}} \cdot \cos^{m+1}\theta_0 + \frac{\cos\theta_{1min} - \cos\theta_{1max} \cdot \cos^{m+1}\theta_{0max}}{1-\cos^{m+1}\theta_{0max}} \quad \text{(Expression 3)}$$

Here, $\theta_{1max}$ denotes the design maximum value of the emission angle $\theta_1$ of emergent light from lens member 1103 and substantially has the same value as the transmission angle α. $\theta_{1min}$ denotes the design minimum value of the emission angle $\theta_1$ and, in many cases, may be 0°. Thus, the relationship $\theta_{1max} \gtrsim \theta_{1min}$ is established. $\theta_{0max}$ denotes the maximum value of the emission angle $\theta_0$ from light-emitting device 1101 reaching refracting surface 1103a. The limit value of $\theta_{0max}$ is determined depending on the processing maximum value of the angle β between the normal to the refracting surface 1103a and the principal light axis shown in FIG. 2, $\theta_{1max}$ and the refractive index $n_a$ of lens member 1103. m denotes the coefficient when the radiation intensity distribution $p_0(\theta_0)$ with respect to the emission angle $\theta_0$ from light-emitting device 1101 is approximated to the Lambertian distribution of Expression 2. For example, in the case of a nondirectional surface light source, such as radiation light from the top surface of the LED, the relationship m≅1 is established. The relationship between the emission angle $\theta_0$ from light-emitting device 1101 and the emission angle $\theta_1$ from lens member 1103 shown in FIG. 5 indicates a case where $\theta_{1max}$=15°, $\theta_{1min}$=0°, $\theta_{0max}$=45°, and m=1 in Expression 3.

As described below, with the configuration of optical emitting module 1100 of the first embodiment, even when the light-emitting surface of the light source is large, it is possible to suppress the spread of emergent light from the lens member, realizing a light intensity distribution with high uniformity. In optical emitting module 1100 of the first embodiment, with the feature of the refracting surface 1103a that, as the emission angle $\theta_0$ from light-emitting device 1101 increases, the emission angle $\theta_1$ from lens member 1103 decreases monotonically, even when the light-emitting surface of the light source is large, it is possible to suppress the spread of emergent light from the lens member, realizing a light intensity distribution with high uniformity. Hereinafter, the operations will be described.

Figure 8:
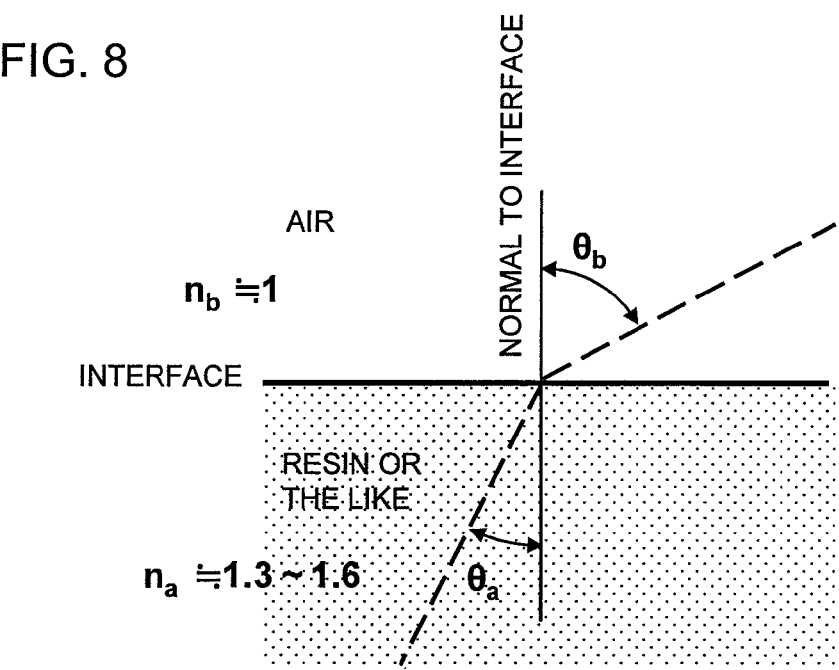

First, the refraction characteristic of light will be discussed. FIG. 8 is an explanatory view showing a mode of refraction in general at the interface between air (refractive index $n_b$≅1) and a high-refractive-index material (for example, refractive index $n_a$≅1.3 to 1.6), such as resin. The relationship between the angle $\theta_a$ of a light beam within resin or the like with respect to the normal to the interface and the angle $\theta_b$ of a light beam within air with respect to the normal to the interface is expressed by the following expression in accordance with the well-known Snell's law.

$$n_b \sin \theta_b = n_a \sin \theta_a \qquad \text{(Expression 4)}$$

With the above, the ratio $d\theta_b/d\theta_a$ of change in the angle $\theta_b$ of a light beam within air to change in the angle $\theta_a$ of a light beam within resin or the like is calculated by the following expression.

$$\frac{d\theta_b}{d\theta_a} = \frac{n_a}{n_b} \frac{\cos\theta_a}{\sqrt{1-\left(\frac{n_a}{n_b}\sin\theta_a\right)}} \qquad \text{(Expression 5)}$$

Figures 9, 11:
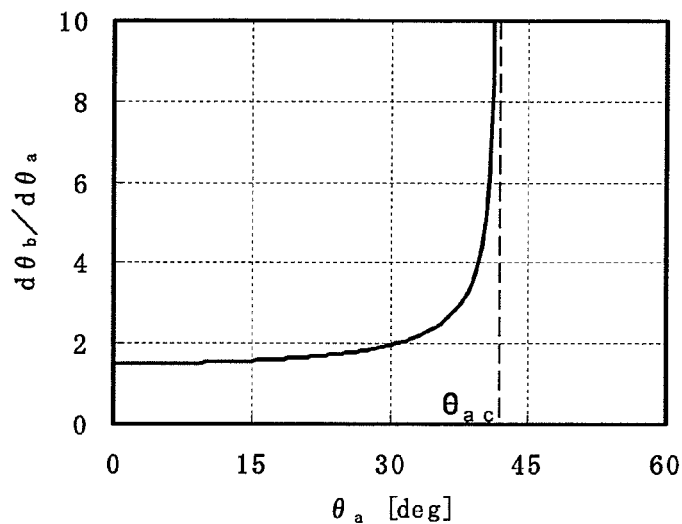
FIG. 9 is a characteristic diagram regarding the ratio $d\theta_b/d\theta_a$ of changes in angle at the time of refraction.
FIG. 11 is an explanatory view of the angular characteristics of light beams with an emission angle near a maximum value in the optical emitting module according to the first embodiment and the known optical emitting module.

FIG. 9 shows the relationship between the angle $\theta_a$ and $d\theta_b/d\theta_a$ in Expression 5 when $n_a$=1.5 and $n_b$=1. It can be seen from FIG. 9 that, when $\theta_a$ is around 0°, as will be understood from Expression 5, $d\theta_b/d\theta_a$ has a value close to $n_a/n_b$ and, as $\theta_a$ is approximated to a critical angle $\theta_{ac}=\sin^{-1}(n_b/n_a)$, $d\theta_b/d\theta_a$ has a very large value.

Figure 10A:
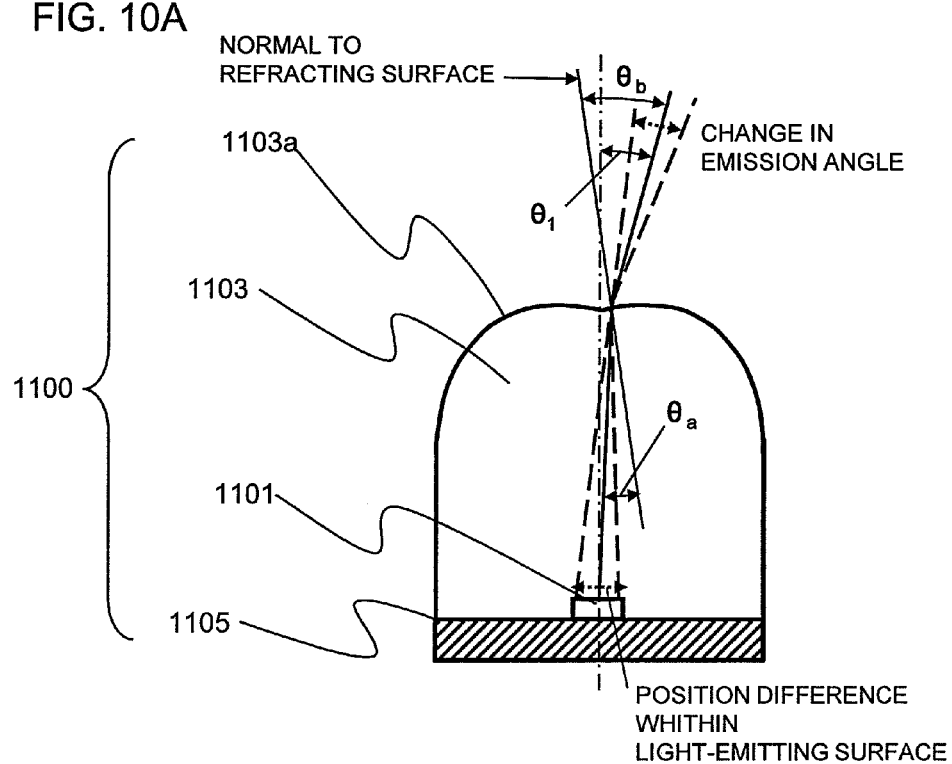
FIG. 10A is a light beam diagram of a light beam with an emission angle near a maximum value in the optical emitting module according to the first embodiment.
Figure 10B:
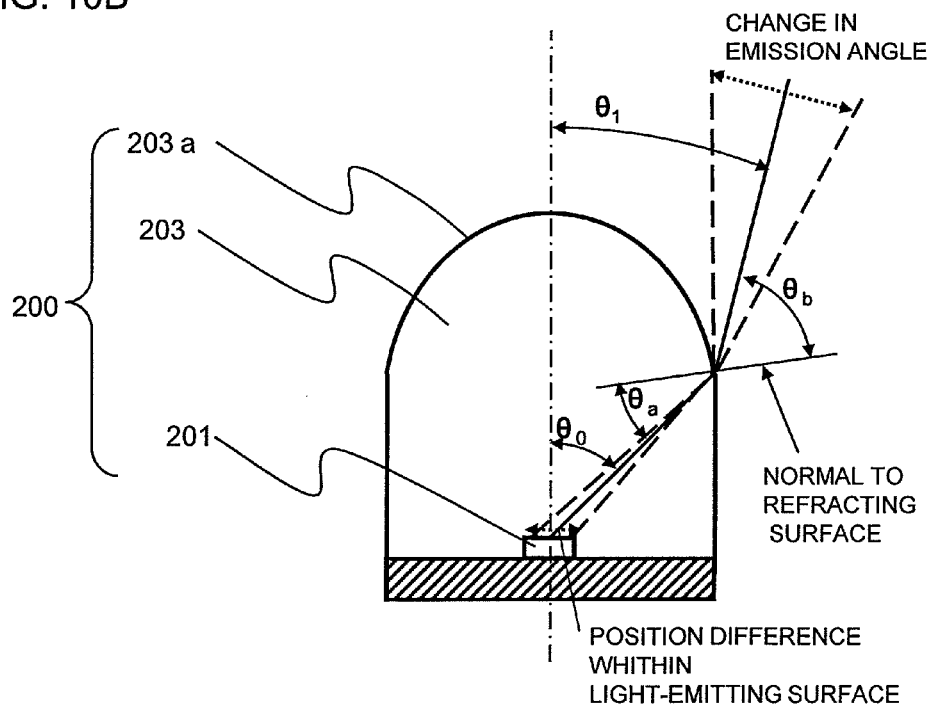
FIG. 10B is a light beam diagram of a light beam with an emission angle near a maximum value in the known optical emitting module.

Next, comparison will be done between optical emitting module 1100 of the first embodiment and known optical emitting module 200 focusing on a light beam with the emission angle $\theta_1$ from the lens member close to the maximum value. FIG. 10A shows a light beam with the emission angle $\theta_1$ from lens member 1103 close to the maximum value in optical emitting module 1100 of the first embodiment. FIG. 10B shows a light beam with the emission angle $\theta_1$ from lens member 203 close to the maximum value in known optical emitting module 200. In FIG. 10A and FIG. 10B, light beams emitted from the centers of light-emitting devices 1101 and 201 are indicated by solid lines. In optical emitting module 1100 of the first embodiment shown in FIG. 10A, as the emission angle $\theta_0$ from light-emitting device 1101 increases, the emission angle $\theta_1$ from lens member 1103 decreases (see FIG. 4). Thus, when $\theta_0$ is around 0° (substantially parallel to the principal light axis of optical emitting module 1100), the emission angle $\theta_1$ from lens member 1103 becomes close to the maximum value. In contrast, in known optical emitting module 200 shown in FIG. 10B, as the emission angle $\theta_0$ from light-emitting device 201 increases, the emission angle $\theta_1$ from lens member 203 increases (see FIG. 6). Thus, the emission angle $\theta_1$ from lens member 203 becomes close to the maximum value around a portion where the emission angle $\theta_0$ from light-emitting device 201 has the maximum value (the outer circumference of refracting surface 203a). In FIGS. 10A and 10B, the angles of the light beam with respect to the normal to refracting surfaces 1103a and 203a within and outside lens members 203 and 1103 are shown as angles $\theta_a$ and $\theta_b$. In comparison of optical emitting module 1100 of the first embodiment shown in FIG. 10A and known optical emitting module 200 shown in FIG. 10B, it can be seen that, in the optical emitting module of the first embodiment shown in FIG. 10A, the angle $\theta_a$ is smaller.

In FIGS. 10A and 10B, light beams which are emitted around the outer circumference of light-emitting devices 1101 and 201, and pass through the same positions of the refracting surfaces 1103a and 203a as light beams indicated by solid lines are indicated by broken lines. With regard to emergent light from the entire light-emitting surfaces of light-emitting devices 1101 and 201 (the top surfaces of light-emitting devices 1101 and 201 of FIGS. 10A and 10B), light beams between the broken lines overlap each other. These light beams change in the angle $\theta_a$ with respect to the normal to the refracting surfaces in accordance with the emission position of the light-emitting surface. In FIGS. 10A and 10B, the change width of the angle $\theta_a$ is at the same level. However, as described above, while the angle $\theta_a$ in FIG. 10A is small, the angle $\theta_a$ in FIG. 10B is large. As shown in FIG. 9, if $\theta_a$ increases, $d\theta_b/d\theta_a$ increases. As a result, the change width of the $\theta_b$, that is, the change width of the emission angle $\theta_1$ from the lens member is small in optical emitting module 1100 of the first embodiment shown in FIG. 10A but increases in known optical emitting module 200 shown in FIG. 10B. With regard to the emission of light with the emission angle $\theta_1$ from lens members 1103 and 203 near the maximum value, the relationship regarding the angle change depending on the emission position of the light-emitting surface is collectively as shown in FIG. 11.

Subsequently, the radiation intensity distribution from the optical emitting module will be described.

Figure 12:
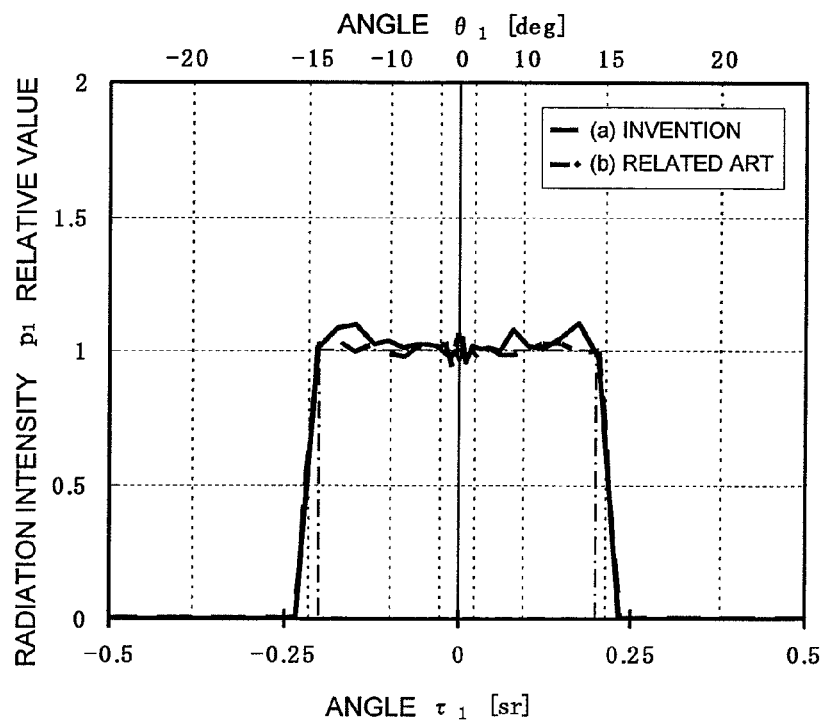
FIG. 12 is a characteristic diagram of the radiation intensity distributions of a minute light-emitting device in the optical emitting module according to the first embodiment and the known optical emitting module.

FIG. 12 is a diagram showing the simulation results of the distribution (a) of radiation intensity $p_1$ in optical emitting module 1100 of first embodiment and the distribution (b) of radiation intensity $p_1$ in known optical emitting module 200 when light-emitting devices 1101 and 201 are minute, that is, in the case of point light sources. The vertical axis of FIG. 12 represents the simulation result of radiation intensity $p_1$ [mW/sr] by relative values excluding the same reference value for (a) optical emitting module 1100 of the first embodiment and (b) known optical emitting module 200. Since it can be seen that the area of the radiation intensity distribution is in proportion to light power [mW], the lower horizontal axis of FIG. 12 is represented in the scale of a solid angle $\tau_1$ [sr]=$2\pi(1-\cos\theta_1$ [rad]). The upper horizontal axis represents the value of a plane angle $\theta_1$ [deg]. In this simulation, the diameter $D_L$ of each of lens members 1103 and 203 is $\phi$3 mm, light-emitting devices 1101 and 201 are point light sources, and the design maximum emission angle $\theta_{1max}$ from each of lens members 1103 and 203 is 15°. na=1.54, nb=1, and the distance Ls from light-emitting device 1101 to the outer circumference of refracting surface 1103a along the principal light axis is 1.5 mm. The distance Lc from light-emitting device 1101 to the center of refracting surface 1103a along the principal light axis is 2.622 mm.

As will be seen from FIG. 12, when light-emitting devices 1101 and 201 are point light sources, in both of optical emitting module 1100 of the first embodiment and known optical emitting module 200, a substantially uniform radiation intensity distribution is obtained within a range of about ±15°. The minimum transmission distance within the transmission angle range is determined depending on the radiation intensity indicated by a one-dot-chain line in FIG. 12. Thus, when light-emitting devices 1101 and 201 are point light sources, the minimum transmission distance of optical emitting module 1100 of the first embodiment and the minimum transmission distance of known optical emitting module 200 are at the same level.

Figure 13:
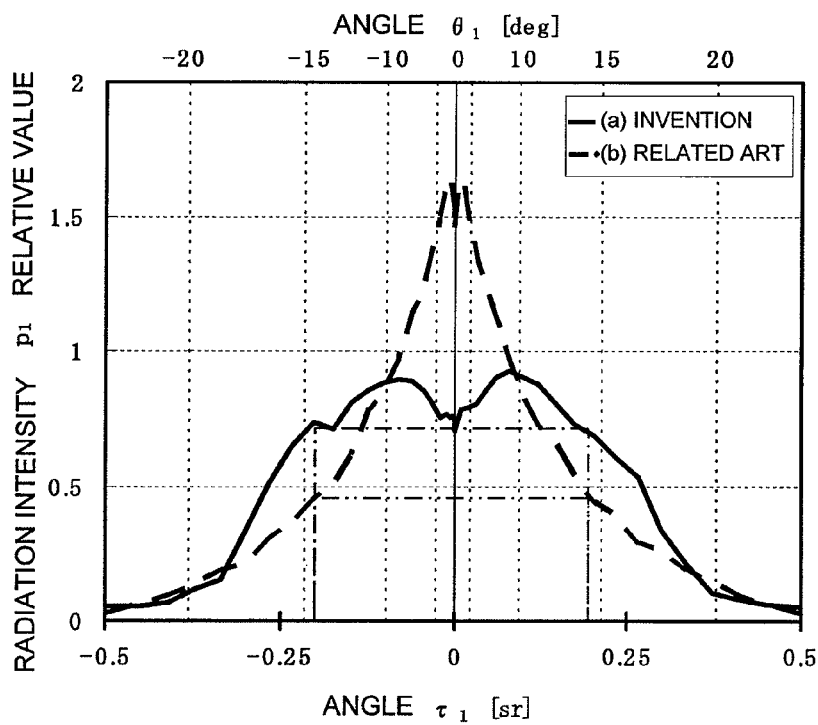
FIG. 13 is a characteristic diagram of the radiation intensity distribution for a light-emitting device having a large light-emitting surface in the optical emitting module according to the first embodiment and the known optical emitting module.

FIG. 13 is a diagram showing the simulation result when only the light-emitting surface of each of light-emitting devices 1101 and 201 changes in the size compared to the above-described simulation when light-emitting devices 1101 and 201 are point light sources. In this simulation, the light-emitting surface of each of light-emitting devices 1101 and 201 has a circular shape of $\phi$0.4 mm, which corresponds to the size of the light-emitting surface of a general LED with a square top surface having a side length of about 0.3 mm. Comparison will be done between FIGS. 13 and 12. Referring to FIG. 13, it can be seen that, in both of (a) optical emitting module 1100 of the first embodiment and (b) known optical emitting module 200, the radiation intensity distribution spreads outside ±15° and a uniform radiation intensity distribution is collapsed. However, as described above with reference to FIG. 10A and FIG. 10B, in (a) optical emitting module 1100 of the first embodiment, since the spread of light at ±15° in FIG. 12 is small, a uniform radiation intensity distribution can be comparatively maintained. In contrast, in (b) known optical emitting module 200, since light at ±15° in FIG. 12 significantly spreads, a radiation intensity distribution has low uniformity and a narrow directivity angle. Accordingly, in known optical emitting module 200, the minimum transmission distance within the transmission angle range is limited by the radiation intensity indicated by a two-dot-chain line in FIG. 13, and the transmission distance is significantly degraded. In contrast, in optical emitting module 1100 according to the first embodiment of the invention, the minimum transmission distance within the transmission angle range is determined by the radiation intensity indicated by a one-dot-chain line in FIG. 13, such that it is possible to extend the transmission distance compared to known optical emitting module 200.

As described above, in optical emitting module 1100 of this embodiment, refracting surface 1103a has a feature such that, as the emission angle $\theta_0$ from light-emitting device 1101 increases, the emission angle $\theta_1$ from lens member 1103 decreases. Thus, even when the light-emitting surface of light-emitting device 1101 is large, it is possible to suppress the spread of light from lens member 1103 around the maximum emission angle $\theta_{1max}$, suppressing the degradation of uniformity of the radiation intensity distribution due to the large light-emitting surface. Therefore, for example, if optical emitting module 1100 of the first embodiment is used for an optical space transmitter of an optical space transmission system, it is possible to improve the characteristics, such as extension of the transmission distance, compared to a case where known optical emitting module 200 is used.

Next, the transmission angle range will be described in which optical emitting module 1100 of the first embodiment exhibits the above-described effects. In order to reveal the transmission angle range in which it is possible to suppress the degradation of uniformity of the radiation intensity distribution due to the large light-emitting surface, comparison is done as to $d\theta_b/d\theta_a$ of light beams from lens members 1103 and 203 with the emission angle $\theta_1$ of substantially the transmission angle $\alpha$ in FIGS. 10A and 10B. First, as shown in FIG. 10A, in optical emitting module 1100 of the first embodiment, with regard to light emitted from the center of light-emitting device 1101 to the vicinity of the principal light axis ($\theta_0 \cong 0°$), the emission angle $\theta_1$ substantially becomes the transmission angle $\alpha$. In this case, the following relationship is established.

$$\theta_b \cong \theta_a + \alpha \qquad \text{(Expression 6)}$$

From Expressions 6 and 4, $\theta_a$ is represented by $\alpha$ as follows.

$$\theta_a \cong \tan^{-1}\left\{\frac{n_b \sin\alpha}{n_a - n_b \cos\alpha}\right\} \qquad \text{(Expression 7)}$$

Figure 14:
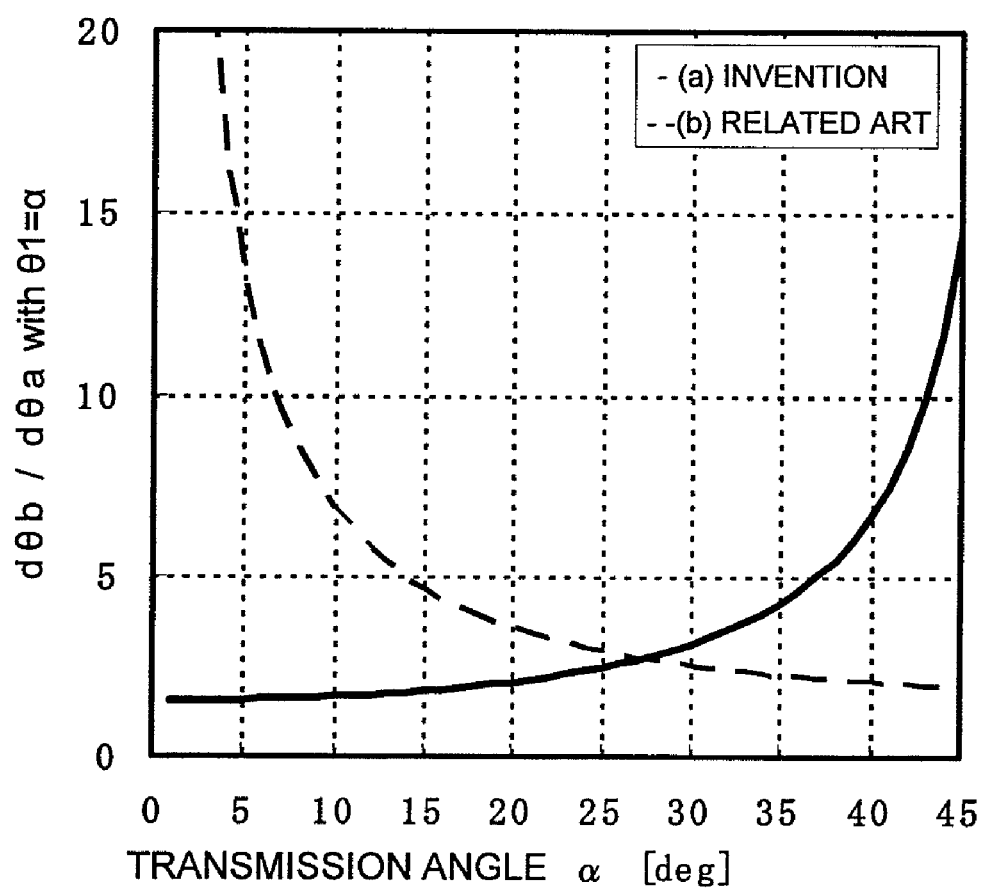
FIG. 14 is a characteristic diagram showing changes in $d\theta_b/d\theta_a$ depending on a transmission angle in the optical emitting module according to the first embodiment and the known optical emitting module.

From Expressions 7 and 5, in optical emitting module 1100 of the first embodiment, the relationship between the transmission angle $\alpha$ and $d\theta_b/d\theta_a$ in the vicinity of the light axis where the relationship $\theta_1 \cong \alpha$ is established is as indicated by a solid line in FIG. 14 when $n_a$=1.5 and $n_b$=1.

As shown in FIG. 10B, in known optical emitting module 200, for example, when the normal to refracting surface 203a is at right angles to the principal light axis, the relationship $\theta_1 \cong \alpha$ is established. In this case, the following relationship is established.

$$\theta_b \cong (\pi/2) - \alpha \qquad \text{(Expression 8)}$$

From Expressions 8 and 4, $\theta_a$ is expressed by $\alpha$ as follows.

$$\theta_a \cong \sin^{-1}\left\{\frac{n_b}{n_a}\cos\alpha\right\} \qquad \text{(Expression 9)}$$

From Expressions 9 and 5, in known optical emitting module 200, the relationship between the transmission angle $\alpha$ and $d\theta_b/d\theta_a$ of a light beam where the relationship $\theta_1 \cong \alpha$ is established is as indicated by a broken line in FIG. 14.

As will be apparent from FIG. 14, when the transmission angle $\alpha$ is smaller than about 27°, $d\theta_b/d\theta_a$ is small in (a) optical emitting module 1100 of the first embodiment rather than (b) known optical emitting module 200. As $d\theta_b/d\theta_a$ of a light beam where the relationship $\theta_1 \cong \alpha$ is established is small, the spread of light from each of lens members 1103 and 203 around the maximum emission angle $\theta_{1max}$ is suppressed. Thus, if the maximum value of emission angle $\theta_1$ from each of lens members 1103 and 203 is about 30°, there is no problem for practical use.

Description has been described that, in optical emitting module 1100 of the first embodiment, refracting surface 1103a is configured such that, as the emission angle $\theta_0$ from light-emitting device 1101 increases, the emission angle $\theta_1$ from lens member 1103 decreases. However, in other words, as will be apparent from FIG. 11 and the description, in the first embodiment, lens member 1103 has a feature that the angle $\theta_a$ between a light beam from light-emitting device 1101 and refracting surface 1103a is substantially minimized within a range where the emission angle $\theta_1$ from lens member 1103 is close to the maximum value. Alternatively, it can also be said that lens member 1103 has a feature that, as the angle $\theta_a$ between a light beam emitted from light-emitting device 1101 and refracting surface 1103a increases, the emission angle $\theta_1$ from lens member 1103 substantially decreases monotonically.

Although in the first embodiment, a case has been described where lens member 1103 and seal member 1104 are formed of the same material as a single body, it should be noted that lens member 1103 and seal member 1104 may be formed of different materials. For example, lens member 1103 may be formed of acrylic resin and seal member 1104 may be formed silicone resin. In this case, refracting surface 1103a also has a feature that, as the emission angle $\theta_0$ from light-emitting device 1101 increases, the emission angle $\theta_1$ from lens member 1103 decreases, obtaining the same effects.

The above-described description has been provided mainly as to the characteristics regarding the direction ($\theta_1$ in FIG. 4) of a light beam in optical emitting module 1100 of the first embodiment, and the resultant operations and effects. Hereinafter, the shape of refracting surface 1103a in optical emitting module 1100 of the first embodiment will be described in detail.

Figure 15:
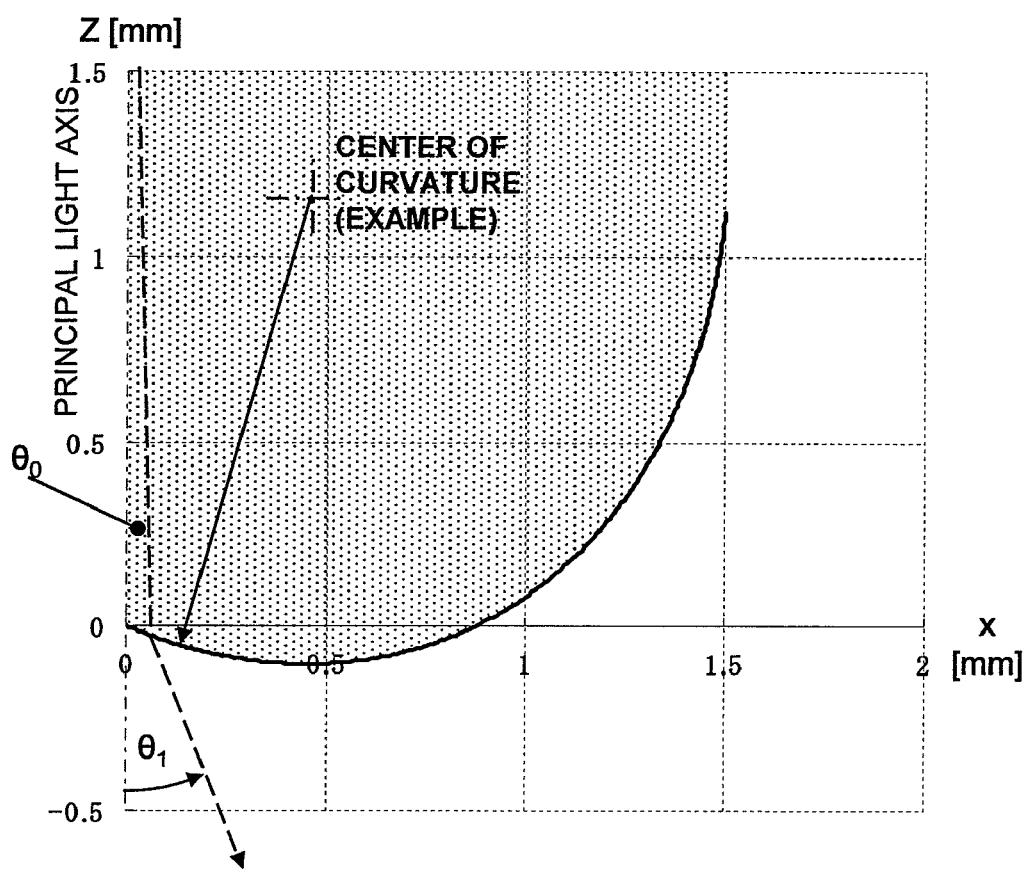
FIG. 15 is a detail view of the shape of the refracting surface in the optical emitting module according to the first embodiment.

FIG. 15 is a detail view of the shape of refracting surface 1103a in the sectional view (FIG. 4) of optical emitting module 1100. In FIG. 15, the up-down direction is reversed with respect to FIG. 4, and only the right half portion of the section is shown. The distance from the center of refracting surface 1103a along the principal light axis is represented as the vertical axis Z, and indicates a sagittal depth used in expressing the shape of the lens surface.

On the other hand, in many cases, an aspheric lens is expressed by the following calculation expression.

$$Z = \frac{x^2/R}{1+\sqrt{1-(1+K)(x/R)^2}} + \sum_{i=1}^{n} A_i |x^n| \quad \text{(Expression 10)}$$

Here, as in FIG. 15, x and Z respectively denote a diameter and a sagittal depth, and K, R, and Ai are constants for determining the shape of an aspheric surface.

If fitting is made to the shape of FIG. 15 when the order i subsequent to the second term in Expression 10 is i=1 to 8, the constants in Expression 10 are as shown in FIG. 16. Meanwhile, since the values of the fitted constants differ depending on a fitting method or required accuracy, it can be said that the values are just an example. From fitted Expression 10, the detailed shape of refracting surface 1103a of FIG. 15 is expressed by the value of (x,Z) as shown in FIG. 17.

As will be understood from FIG. 15 or 17, in optical emitting module 1100 of the first embodiment, lens member 1103 is shaped such that the diameter x is greatest around 0.45 mm, and the central portion is recessed from the greatest portion by 0.102 mm.

Figure 18:
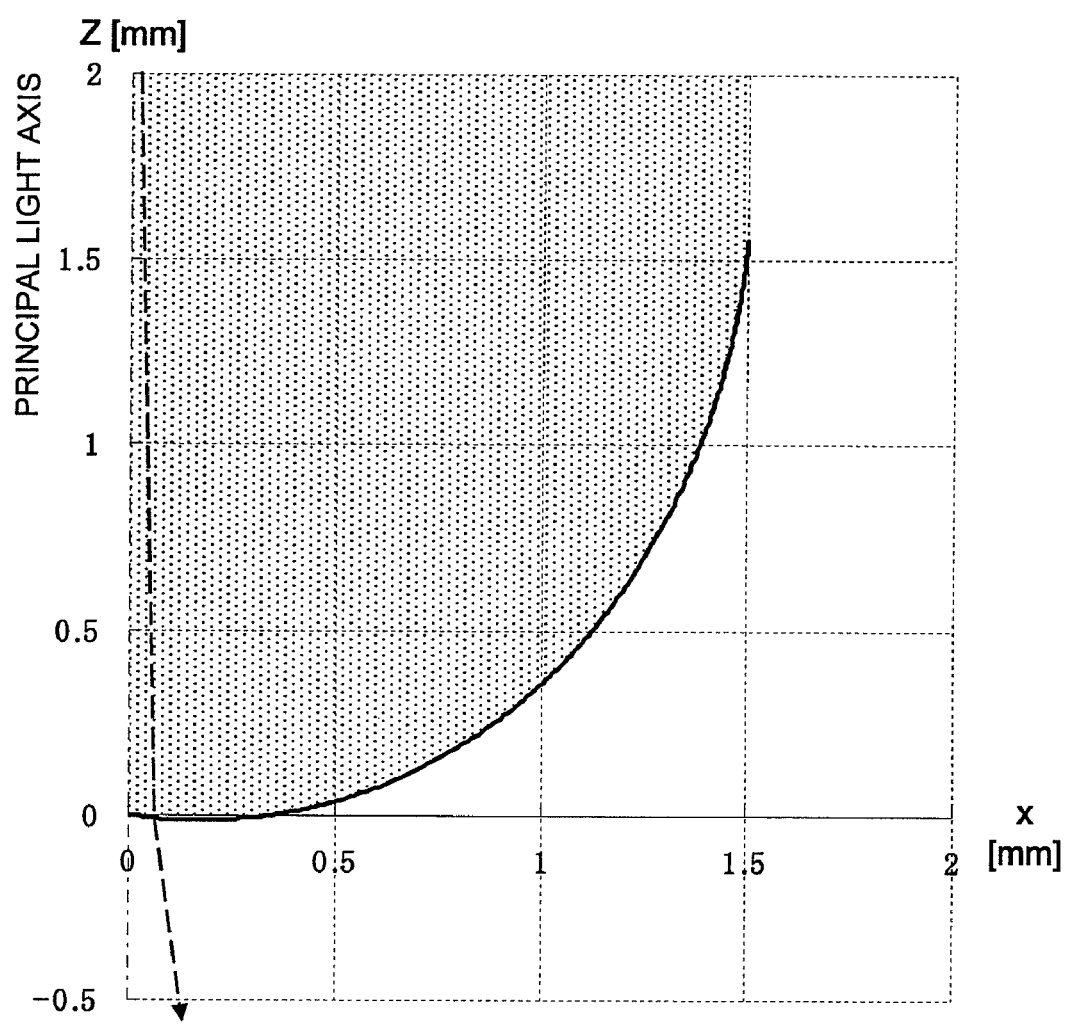
FIG. 18 is a detail view of the shape of a refracting surface in a design modification example of the optical emitting module according to the first embodiment.

Subsequently, in optical emitting module 1100 of the first embodiment, the shape of refracting surface 1103a when design is made while the maximum emission angle $\theta_{1max}$ is changed will be described below. FIG. 18 is a detail view of the shape of refracting surface 1103a in the sectional view (FIG. 4) of optical emitting module 1100 when the maximum emission angle $\theta_{1max}$ is 5°. In FIG. 18, display is made by the same coordinates as in FIG. 15. The diameter $D_L=\phi3$ mm of lens member 1103, na=1.54, nb=1, and the distance Ls=1.5 mm from light-emitting device 1101 to the outer circumference of refracting surface 1103a along the principal light axis are not changed. The distance Lc from light-emitting device 1101 to the center of refracting surface 1103a along the principal light axis is 3.055 mm.

If fitting is made to the shape of FIG. 15 when the order i subsequent to the second term in Expression 10 is i=1 to 8, the constants in Expression 10 are as shown in FIG. 19. From fitted Expression 10, the detailed shape of refracting surface 1103a of FIG. 18 is expressed by the value of (x,Z) as shown in FIG. 20.

As will be understood from FIG. 18 or 20, in optical emitting module 1100 of the first embodiment, lens member 1103 is shaped such that the diameter x is greatest around 0.2 mm, and the central portion is recessed from the greatest portion by 0.013 mm.

As described above, in optical emitting module 1100 of the first embodiment, refracting surface 1103a (that is, lens member 1103) has the geometric feature that the central portion is recessed. As has already been described, in optical emitting module 1100 of the first embodiment, when $\theta_0$ is around 0° (substantially parallel to the principal light axis of optical emitting module 1100), the emission angle $\theta_1$ from lens member 1103 becomes close to the maximum value (see FIGS. 4, 10A, and 10B). That is, as a light beam indicated by a broken line in FIG. 15 or 18, a light beam with the emission angle $\theta_0$ from light-emitting device 1101 close to 0° passing through refracting surface 1103a around x=0 mm is deflected in a direction close to the maximum emission angle $\theta_{1max}$ from lens member 1103. For this reason, the surface around the center of the refracting surface 1103a is inclined in the light axis direction. Thus, a recess (concave portion) is formed around the center of lens member 1103. This is one of the features regarding the shape of refracting surface 1103a of the invention.

As will be understood from FIGS. 15 and 18, refracting surface 1103a is formed such that the entire portion, excluding the point x=0 mm, has a convex shape (the curvature center is located inside the lens) outward of lens member 1103. This is based on the feature of the invention that, as the emission angle $\theta_0$ from light-emitting device 1101 increases, the emission angle $\theta_1$ from lens member 1103 decreases. The increase in the emission angle $\theta_0$ from light-emitting device 1101 means that the diameter x of the refracting surface increases, and the gradual decrease in the emission angle $\theta_1$ from lens member 1103 means that the surface of refracting surface 1103a gradually goes outward. Thus, the entire portion, excluding the point x=0 mm, has a convex shape (the curvature center is located inside the lens) outward of lens member 1103. This is another feature regarding the shape of refracting surface 1103a of the invention.

Next, the above-described two features regarding the shape of refracting surface 1103a are expressed in a mathematical form. The first feature, that is, the feature that the surface around the center of refracting surface 1103a is inclined in the light axis direction, and the recess (concave portion) is formed around the center of lens member 1103 is expressed around x=0 as follows.

$$dZ/dx < 0 \quad \text{(Expression 11)}$$

If the emission angle $\theta_1$ from lens member 1103 is $\theta_1=\theta_{1max}$ around the emission angle $\theta_0=0$ from light-emitting device 1101, the following relationship is established around x=0 in accordance with the Snell's law.

$$\frac{dZ}{dx} \cong -\frac{n_b \sin\theta_{1max}}{n_a - n_b \cos\theta_{1max}} \qquad \text{(Expression 12)}$$

When the aspheric surface expression of Expression 10 is used, the following relationship is established.

$$\frac{dZ}{dx} = \frac{2x}{R\left(\sqrt{1-\frac{(K+1)x^2}{R^2}}+1\right)} + \qquad \text{(Expression 13)}$$

$$\frac{(K+1)x^3}{R^3\sqrt{1-\frac{(K+1)x^2}{R^2}}\left(\sqrt{1-\frac{(K+1)x^2}{R^2}}+1\right)^2} +$$

$$\sum_{i=1}^{n} iA_i|x^{n-1}|$$

Thus, when x=0, the relationship of Expression 8 or 9 is established.

$$\left(\frac{dZ}{dx}\right)_{x=0} = A_i < 0 \qquad \text{(Expression 14)}$$

$$\left(\frac{dZ}{dx}\right)_{x=0} = A_i \cong -\frac{n_b \sin\theta_{1max}}{n_a - n_b \cos\theta_{1max}} \qquad \text{(Expression 15)}$$

The second feature, that is, the feature that the entire portion, excluding the point x=0 mm, has a convex shape (the curvature center is located inside the lens) outward of lens member 1103 is expressed as follows.

$$\frac{d^2Z}{dx^2} > 0 \qquad \text{(Expression 16)}$$

When the aspheric surface expression of Expression 10 is used, the following relationship is established.

$$\frac{d^2Z}{dx^2} = \frac{2}{R\left(\sqrt{1-\frac{(K+1)x^2}{R^2}}+1\right)} + \qquad \text{(Expression 17)}$$

$$\frac{5(K+1)x^2}{R^3\sqrt{1-\frac{(K+1)x^2}{R^2}}\left(\sqrt{1-\frac{(K+1)x^2}{R^2}}+1\right)} +$$

$$\frac{(K+1)^2 x^4}{R^5\left(1-\frac{(K+1)x^2}{R^2}\right)^{3/2}\left(\sqrt{1-\frac{(K+1)x^2}{R^2}}+1\right)^2} +$$

-continued $$\frac{2(K+1)^2 x^4}{R^5\left(\sqrt{1-\frac{(K+1)x^2}{R^2}}\right)\left(\sqrt{1-\frac{(K+1)x^2}{R^2}}+1\right)^3} +$$

$$\sum_{i=2}^{n} i(i-1)A_i|x^{n-2}| > 0$$

Known optical emitting module 200 described in Japanese Patent Unexamined Publication No. 2005-142447 has a recess (concave portion) at the central portion of lens 203. However, in known optical emitting module 200, the recess (concave portion) is provided for the purpose of "scattering" so as to make light concentratively distributed around the light axis of the light source uniform over the wide range. Thus, there is a difference in that, in optical emitting module 1100 of the first embodiment, the recess (concave portion) is provided for the purpose of "deflecting" light around the center in a direction close to the maximum emission angle $\theta_{1max}$. For this reason, there is a geometric difference in that, while in known optical emitting module 200, when a recess (concave portion) is provided at the central portion of lens 203, a concave shape is provided around the center of 203 (the curvature center is located outside the lens), in optical emitting module 1100 of the first embodiment, a concave shape is provided around the center outward of lens member 1103 (the curvature center is located inside the lens).

Meanwhile, in optical emitting module 1100 of the first embodiment, a rapid change in the inclination of the surface occurs at the center (the point x=0 in FIG. 15) of refracting surface 1103a. For this reason, when it is difficult to provide a rapid change in the inclination of the surface due to problems in lens processing, for example, a concave shape may be provided within a range of a radius 0.1 mm or within a range of a radius half of the range of the recess.

Second Embodiment

Figure 21:
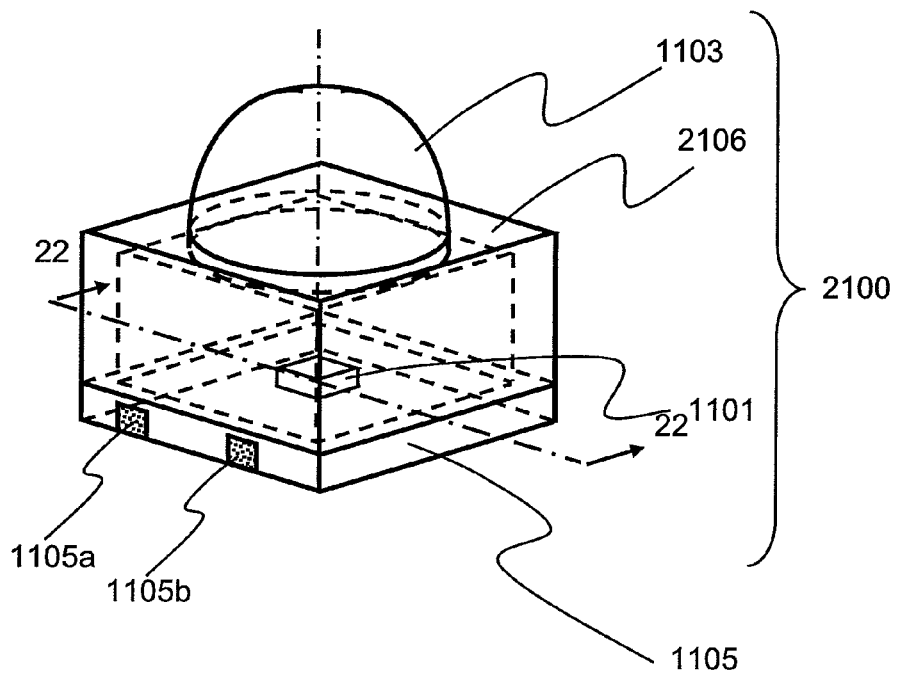
FIG. 21 is a perspective configuration diagram of an optical emitting module according to a second embodiment.
Figure 22:
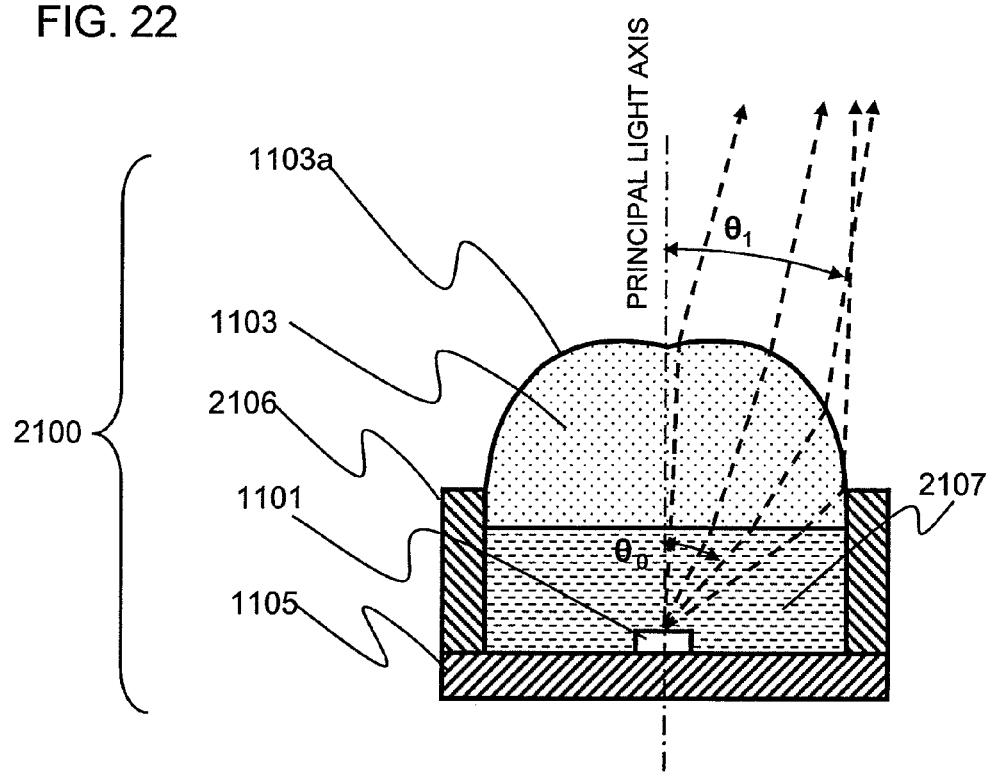
FIG. 22 is a sectional configuration diagram showing the working of a refracting surface in the optical emitting module according to the second embodiment.

FIG. 21 is a perspective view showing the configuration of an optical emitting module according to a second embodiment of the invention. FIG. 22 is a sectional view taken along a two-dot-chain line of FIG. 21. In FIGS. 21 and 22, the same parts as those in optical emitting module 1100 of the first embodiment shown in FIGS. 1A, 1B, and 2 are represented by the same reference numerals, and description thereof will be omitted.

Optical emitting module 2100 shown in FIGS. 21 and 22 is not provided with seal member 1104 of optical emitting module 1100 shown in FIGS. 1A, 1B, and 2, and lens member 1103 and substrate 1105 of optical emitting module 2100 are held by housing 2106. There is a difference from seal member 1104 of optical emitting module 1100 shown in FIGS. 1A, 1B, and 2 in that housing interior 2107 surrounded by lens member 1103, substrate 1105, housing 2106, and light-emitting device 1101 is filled with air or inert gas for preventing alterations of light-emitting device 1101.

In the second embodiment, refracting surface 1103a has a feature that, as the emission angle $\theta_0$ from light-emitting device 1101 increases, the emission angle $\theta_1$ of emergent light from lens member 1103 decreases. Thus, similarly to the first embodiment of the invention, even when the light-emitting surface of light-emitting device 1101 is large, it is possible to suppress the spread of light around the maximum emission angle from lens member 1103, suppressing the degradation of uniformity of the radiation intensity distribution due to the large light-emitting surface.

Although in the second embodiment, housing interior 2107 is filled with air, inert gas, or the like, from the description of the first embodiment, it should be noted that resin, such as gel-like or rubber-shaped silicone resin, may be filled in housing interior 2107.

An optical emitting module according to an aspect of the invention includes a light-emitting device and a lens member. The lens member has a feature that a light beam with the maximum emission angle $\theta_1$ from the lens member is emitted from the refracting surface around a point where the refracting surface and the principal light axis cross each other. The position on the refracting surface where a light beam with the maximum emission angle $\theta_1$ from the lens member is emitted is around the point where the refracting surface and the principal light axis cross each other. The reason is that there is a possibility that, even in a lens member which is manufactured in accordance with the invention, for example, so as to satisfy the condition of Expression 3 such that a light beam with the maximum emission angle $\theta_1$ is emitted from the point where the refracting surface and the principal light axis cross each other, at the point where the refracting surface and the principal light axis cross each other, the desired condition of Expression 3 is not satisfied due to manufacturing problems or design problems.

For example, even when a light beam with the maximum emission angle $\theta_1$ is not emitted at the point where the refracting surface and the principal light axis cross each other, the condition of Expression 3 is satisfied in a region excluding a portion where the lens member does not satisfy the desired condition. Thus, if a light beam with the maximum emission angle $\theta_1$ is emitted from a portion in the region closest to the point where the refracting surface and the principal light axis cross each other, the effects of the invention can be obtained.

An optical emitting module according to another aspect of the invention includes a light-emitting device and a lens member. The lens member has a feature that a light beam with a small emission angle $\theta_0$ from the light-emitting device has a large emission angle $\theta_1$ from the lens member. Although a case has been described where the lens member has a feature that a light beam with a small emission angle $\theta_0$ from the light-emitting device has a large emission angle $\theta_1$ from the lens member, this feature may not be completely satisfied over the entire region of the refracting surface of the lens member. For example, even when a light beam with a locally small emission angle $\theta_0$ has a small emission angle $\theta_1$ from the lens member in a region of the refracting surface of the lens member due to manufacturing problems or design problems, if a light beam with a small emission angle $\theta_0$ has a large emission angle $\theta_1$ from the lens member as a whole, the effects of the invention can be obtained.

An optical emitting module according to still another aspect of the invention includes a light-emitting device and a lens member. The incidence angle $\theta_a$ of a light beam with the maximum emission angle $\theta_1$ from the lens member is smaller than the incidence angle $\theta_a$ of a light beam with the minimum emission angle $\theta_1$ from the lens member. The condition that the incidence angle $\theta_a$ of a light beam with the maximum emission angle $\theta_1$ from the lens member is smaller than the incidence angle $\theta_a$ of a light beams with the minimum emission angle $\theta_1$ from the lens member may be satisfied only in a region of the refracting surface of the lens member where a light beam emitted from the light-emitting device is refracted such that, for example, the condition of Expression 3 is satisfied. For example, in a region of the refracting surface of the lens member, when the condition of Expression 3 is not satisfied due to manufacturing problems or design problems, even though the condition that the incidence angle $\theta_a$ of a light beam with the maximum emission angle $\theta_1$ from the lens member is smaller than the incidence angle $\theta_a$ of a light beam with the minimum emission angle $\theta_1$ from the lens member has not been satisfied due to light beams emitted from the relevant region, there is no problem in obtaining the effects of the invention.

What is claimed is:

1. An optical emitting module comprising:
a light-emitting device that emits light; and
a lens member having a refracting surface configured to refract light emitted from the light-emitting device and to emit the refracted light,
wherein the lens member is configured such that, when the angle of a light beam emitted from the lens member with respect to a principal light axis is $\theta_1$, a light beam with the maximum emission angle $\theta_1$ from the lens member is emitted from a refracting surface in the vicinity of a point where the refracting surface and the principal light axis cross each other, and
wherein the lens member is configured such that, when the angle of a light beam emitted from the light-emitting device with respect to the principal light axis is $\theta_0$, a light beam with a smaller emission angle $\theta_0$ from the light-emitting device is emitted from the lens member with a larger emission angle $\theta_1$.

2. An optical emitting module comprising:
a light-emitting device that emits light; and
a lens member having a refracting surface configured to refract light emitted from the light-emitting device and to emit the refracted light,
wherein the lens member is configured such that, when the angle of a light beam emitted from the lens member with respect to a principal light axis is $\theta_1$, a light beam with the maximum emission angle $\theta_1$ from the lens member is emitted from a refracting surface in the vicinity of a point where the refracting surface and the principal light axis cross each other, and
wherein the lens member is configured such that, when an incidence angle between a light beam which is emitted from the light-emitting device and reaches the refracting surface of the lens member and a normal line to the refracting surface at the point where the light beam reaches is $\theta_a$, the incidence angle $\theta_a$ of a light beam with the maximum emission angle $\theta_1$ from the lens member becomes smaller than the incidence angle $\theta_a$ of a light beam with the minimum emission angle $\theta_1$ from the lens member.

3. An optical emitting module comprising:
a light-emitting device that emits light; and
a lens member having a refracting surface configured to refract light emitted from the light-emitting device and to emit the refracted light,
wherein the lens member is configured such that, when the angle of a light beam emitted from the lens member with respect to a principal light axis is $\theta_1$, a light beam with the maximum emission angle $\theta_1$ from the lens member is emitted from a refracting surface in the vicinity of a point where the refracting surface and the principal light axis cross each other, and
wherein the lens member is configured such that a light intensity distribution of light emitted from a point on the light-emitting device, where the light-emitting device and the principal light axis cross each other, substantially has a constant value when the emission angle $\theta_1$ from the lens member is in a range of $\theta_{1min}$ to $\theta_{1max}$ ($\theta_{1min} \leqq \theta_{1max}$).

4. The optical emitting module of claim 3, wherein, when the angle of a light beam emitted from the light-emitting device with respect to the principal light axis is $\theta_0$, and the maximum value of the emission angle $\theta_0$ from the light-emitting device is $\theta_{0max}$, the lens member is configured to refract a light beam emitted from the point on the light-emitting device where the light-emitting device and the principal light axis cross each other in accordance with following expression and to emit the refracted light beam $$\cos\theta_1 = \frac{\cos\theta_{1max} - \cos\theta_{1min}}{1 - \cos^{m+1}\theta_{0max}} \cdot \cos^{m+1}\theta_0 + \frac{\cos\theta_{1min} - \cos\theta_{1max} \cdot \cos^{m+1}\theta_{0max}}{1 - \cos^{m+1}\theta_{0max}}.$$

5. The optical emitting module of claim 3, wherein $\theta_{1max}$ has a value smaller than 27°.

6. A method of designing an optical emitting module, the optical emitting module comprising:
   a light-emitting device that emits light; and
   a lens member having a refracting surface configured to refract light emitted from the light-emitting device and to emit refracted light,
   wherein the lens member is configured such that, when an angle of a light beam emitted from the lens member with respect to a principal light axis is $\theta_1$, a light beam with the maximum emission angle $\theta_1$ from the lens member is emitted from the refracting surface in the vicinity of a point where the refracting surface and the principal light axis cross each other, and
   wherein an light intensity distribution of light emitted from a point on the light-emitting device where the light-emitting device and the principal light axis cross each other substantially has a constant value when the emission angle $\theta_1$ from the lens member is in a range of $\theta_{1min}$ to $\theta_{1max}$ ($\theta_{1min} \leqq \theta_{1max}$),
   the method comprising:
      designing the refracting surface of the lens member such that, when the angle of a light beam emitted from the light-emitting device with respect to the principal light axis is $\theta_0$, and when the maximum value of the emission angle $\theta_0$ from the light-emitting device is $\theta_{0max}$, a light beam emitted from the point on the light-emitting device where the light-emitting device and the principal light axis cross each other is refracted in accordance with the following expression to emit the refracted light beam $$\cos\theta_1 = \frac{\cos\theta_{1max} - \cos\theta_{1min}}{1 - \cos^{m+1}\theta_{0max}} \cdot \cos^{m+1}\theta_0 + \frac{\cos\theta_{1min} - \cos\theta_{1max} \cdot \cos^{m+1}\theta_{0max}}{1 - \cos^{m+1}\theta_{0max}}.$$

* * * * *